(12) United States Patent
Yamashita et al.

(10) Patent No.: US 10,991,347 B2
(45) Date of Patent: Apr. 27, 2021

(54) LEG OF KEYBOARD INSTRUMENT AND LEG ATTACHMENT STRUCTURE

(71) Applicant: KAWAI MUSICAL INSTRUMENTS MANUFACTURING CO., LTD., Shizuoka (JP)

(72) Inventors: Mitsuo Yamashita, Shizuoka (JP); Hikari Ichihara, Shizuoka (JP)

(73) Assignee: KAWAI MUSICAL INSTRUMENTS MANUFACTURING CO., LTD., Hamamatsu (JP)

( * ) Notice: Subject to any disclaimer, the term of this patent is extended or adjusted under 35 U.S.C. 154(b) by 0 days.

(21) Appl. No.: 16/667,869

(22) Filed: Oct. 29, 2019

(65) Prior Publication Data
US 2020/0135154 A1    Apr. 30, 2020

(30) Foreign Application Priority Data
Oct. 31, 2018    (JP) .............................. JP2018-205801

(51) Int. Cl.
*G10C 3/02*    (2006.01)
*G10C 1/02*    (2006.01)
*F16M 13/00*    (2006.01)

(52) U.S. Cl.
CPC .............. *G10C 3/02* (2013.01); *F16M 13/005* (2013.01); *G10C 1/02* (2013.01)

(58) Field of Classification Search
CPC ........... G10C 3/02; G10C 1/02; F16M 13/005
USPC ..... 248/599, 601, 653, 677, 151, 188, 188.8
See application file for complete search history.

(56) References Cited

U.S. PATENT DOCUMENTS

| 1,642,356 | A | * | 9/1927 | Brey | .......................... G10C 3/02 84/177 |
| 1,800,132 | A | * | 4/1931 | Brubaker | ................. F16B 12/48 248/188 |
| 3,960,352 | A | * | 6/1976 | Plattner | ................ F16M 11/045 248/309.1 |
| 4,549,711 | A | * | 10/1985 | Giltnane | ................ A47C 7/002 248/188 |
| 6,629,506 | B2 | * | 10/2003 | Park | ......................... F16B 9/052 108/156 |
| 7,392,966 | B1 | * | 7/2008 | Chen | ....................... A47B 91/00 248/188.8 |

FOREIGN PATENT DOCUMENTS

JP    S55-99578 U    7/1980

* cited by examiner

*Primary Examiner* — Muhammad Ijaz
(74) *Attorney, Agent, or Firm* — Westman, Champlin & Koehler, P.A.

(57) ABSTRACT

A leg attachment structure for a keyboard instrument including leg main bodies that support a keyboard portion from both sides, the keyboard portion in which plural keys are arranged on a key bed, wherein the leg attachment structure has plates installed on upper surfaces of the leg main bodies, the plates and the leg main bodies are fixed by inserting rod-shaped portions formed on lower surfaces of the plates into hole portions provided in the leg main bodies, and the plates are formed to be larger than an area of the upper surfaces of the leg main bodies, and installed at positions eccentric to the inner side and the rear side of the keyboard portion with respect to the upper surfaces of the leg main bodies.

5 Claims, 4 Drawing Sheets

LEG OF KEYBOARD INSTRUMENT AND LEG ATTACHMENT STRUCTURE

CROSS-REFERENCE TO RELATED APPLICATION

This non-provisional application claims priority to Japanese Patent Application No. 2018-205801, filed on Oct. 31, 2018, the contents of which is hereby incorporated by reference.

TECHNICAL FIELD

The present invention relates to an attachment structure of legs that support a front side portion of a keyboard portion of a keyboard instrument, and relates to a leg attachment structure in which the freedom of design is provided without using toe blocks, and a leg to be used for this leg attachment structure.

BACKGROUND ART

A general leg attachment structure for a keyboard instrument is a structure of supporting a keyboard portion by, in order to ensure strength, arranging legs between side arms provided on both sides of the keyboard portion, the side arms projecting to the player's side from a keyboard instrument main body, and toe blocks projecting to the player's side from both sides of a main body lower portion.

As disclosed in the conventional art described in Patent Literature 1, a leg attachment structure of supporting by legs both side portions of a keyboard portion in which plural keys are arranged on a key bed is also proposed.

In this leg attachment structure, at the time of directly screwing bolts of the legs into screw holes provided on the side arm side, in a case where the legs are different in shape from round legs, due to thread pitches, it is not possible to reliably make desired leg surfaces face the front surface side of an instrument main body. Thus, there is a problem that the leg attachment structure can be adopted only for round legs.

Regarding this problem, the leg attachment structure disclosed in Patent Literature 1 includes bolts provided on upper surfaces of the legs, engagement pins provided in head portions of the bolts in the directions orthogonal to the center axis, bolt attachment holes formed, on lower end surfaces of the side arms, at positions corresponding to the legs, leg fixing metal fittings fixed to the bolt attachment holes for locking the bolts, and elastic members for biasing the legs downward. The leg fixing metal fittings are provided with holes through which the head portions of the bolts and the engagement pins pass, and pin locking portions that lock the engagement pins. Thereby, the leg attachment structure is provided as a structure in which desired leg surfaces can face the front surface side and can be fixed.

CITATION LIST

Patent Literature

Patent Literature 1: Japanese Utility Model Application Publication No. S55-99578

BRIEF SUMMARY OF INVENTION

Technical Problem

However, according to the leg attachment structure described in Patent Literature 1, the leg attachment structure is a complicated fixing structure of using the engagement pins and the leg fixing metal fittings. Thus, there are problems that assembling is troublesome and manufacturing cost is increased.

The present invention is proposed in consideration of the above circumstances, and an object thereof is to provide a leg attachment structure in which the strength can be ensured with a simple structure and the freedom of design of the legs can be extended, and desired leg surfaces can easily face the front surface side of an instrument main body, and a leg to be used for this leg attachment structure.

Solution to Problem

In order to achieve the above-described objects, the present invention is a leg attachment structure for a keyboard instrument including leg main bodies that support a keyboard portion from both sides, the keyboard portion in which plural keys are arranged on a key bed, wherein the leg attachment structure has plates installed on upper surfaces of the leg main bodies, the plates and the leg main bodies are fixed by inserting rod-shaped portions formed on lower surfaces of the plates into hole portions provided in the leg main bodies, and the plates are formed to be larger than an area of the upper surfaces of the leg main bodies.

The present invention is the leg attachment structure for a keyboard instrument, wherein the plates are installed at positions eccentric to the inner side and the rear side of the keyboard portion with respect to the upper surfaces.

The present invention is the leg attachment structure for the keyboard instrument, wherein the plates and the rod-shaped portions are made of metal and the leg main bodies are made of wood, and by forming a thread on the rod-shaped portions and inserting the rod-shaped portions into the hole portions, the leg main bodies and the plates are fixed.

The present invention is the leg attachment structure for a keyboard instrument according to claim 1, wherein by installing side arms on both side surfaces of the key bed, providing groove portions each of which is continuous over both a lower surface of the key bed and a lower surface of each of the side arms, and fitting the plates to the groove portions, the key bed, the side arms, and the leg main bodies are fixed.

The present invention is a leg of a keyboard instrument comprising:

a long leg main body in which a hole portion is provided at a center position on an upper surface; and a plate having an area larger than an area of the upper surface of the leg main body, the plate for which a rod-shaped portion to be inserted into the hole portion is formed, the plate being installed on the upper surface of the leg main body, wherein the rod shape portion is formed at a position eccentric from a center of the plate, and at the time of installing the plate to the leg main body, two adjacent sides of the plate are positioned entirely on the outside of the upper surface of the leg main body.

The present invention is the leg of the keyboard instrument, wherein the plate and the rod-shaped portion are made of metal and the leg main body is made of wood, and by forming a thread on the rod-shaped portion and inserting the rod-shaped portion into the hole portion, the leg main body and the plate are fixed.

Advantageous Effects of Invention

According to the leg attachment structure for a keyboard instrument, by forming the plates to be larger than an area of the upper surfaces of the leg main bodies, the key bed and the leg main bodies can be fixed via the plates while ensuring the strength.

By making the plates eccentric to the inner side and the rear side of the keyboard portion with respect to the upper surfaces of the leg main bodies, the area of the plates can be made wide, and a structure in which the leg main body is not easily displaced to the inner side and the rear side can be obtained.

By forming a thread on the rod-shaped portions of the plates and inserting the rod-shaped portions into the hole portions, the leg main bodies and the plates can be securely fixed.

By providing groove portions each of which is continuous over both a lower surface of the key bed and a lower surface of each of the side arms and fitting the plates thereto, the key bed, the side arm, and the leg main body can be reliably fixed by the single plate.

DESCRIPTION OF EMBODIMENTS

Hereinafter, a leg attachment structure for a keyboard instrument according to an embodiment of the present invention will be described with reference to FIGS. 1 to 4.

Figure 1:
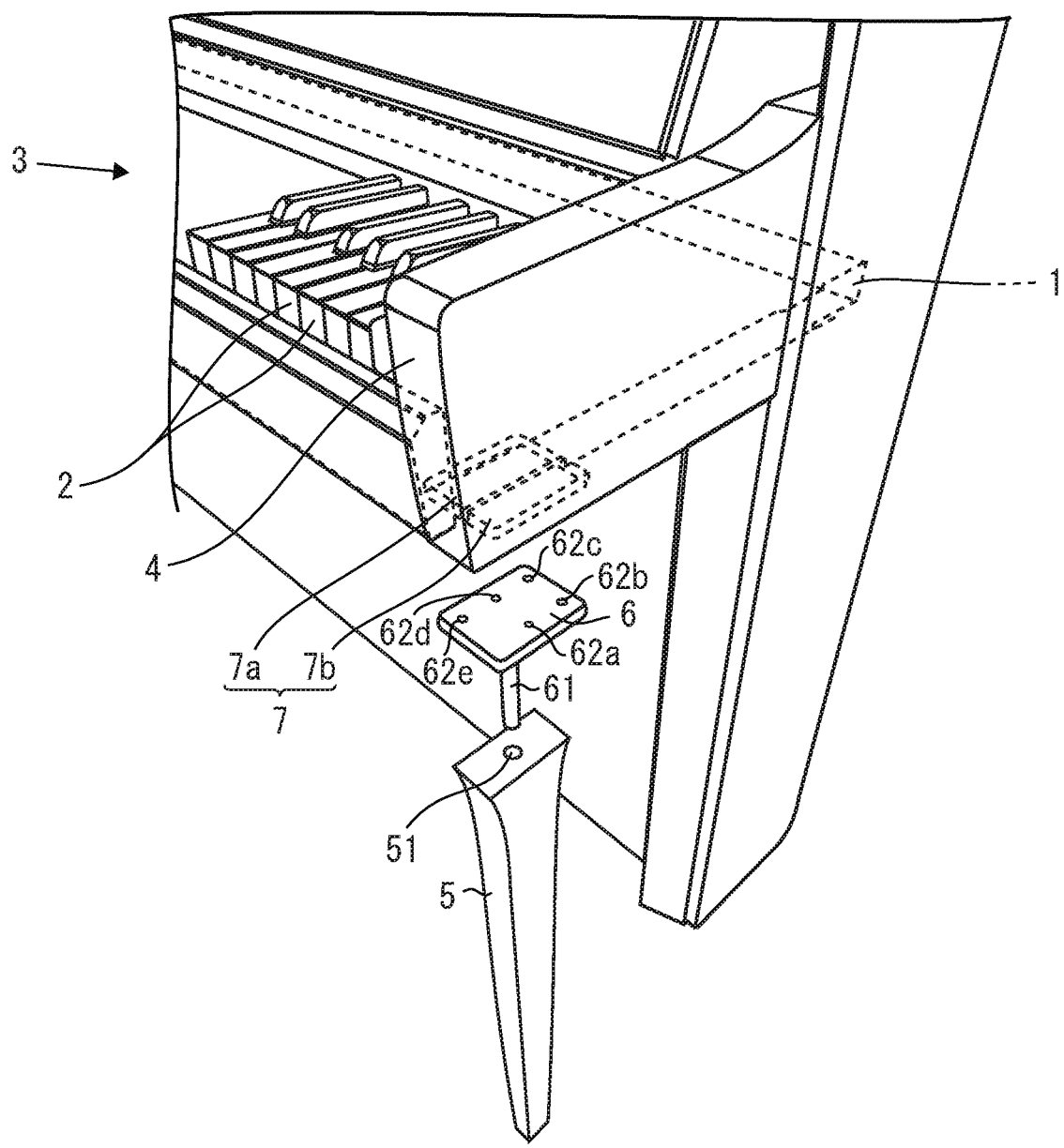
FIG. 1 is an illustrative perspective view showing an assembling state of a leg attachment structure for a keyboard instrument of the present invention.

FIG. 1 is an illustrative perspective view of a part of an upright piano (keyboard instrument) including the leg attachment structure of the present invention. The leg attachment structure includes leg main bodies 5 that support a keyboard portion 3 from both sides, the keyboard portion in which plural keys 2 are arranged on a key bed 1, and plates 6 installed on upper surfaces of the leg main bodies 5.

Each of the leg main bodies 5 is formed by a leg whose upper surface is formed in an oblong shape elongated in the front to back direction of the keyboard portion 3, the leg becoming thinner toward the lower side. The leg main body has a hole portion 51 formed in a circular shape and bored downward in a center portion of the upper surface. The leg main body 5 is made of wood.

Each of the plates 6 is made of metal and formed in an oblong shape elongated in the front to back direction of the keyboard portion 3, and has an area larger than an area of the upper surface of the leg main body 5.

Figure 2:
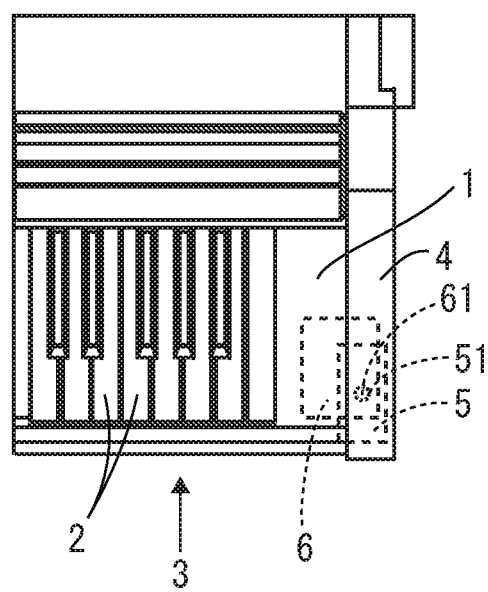
FIG. 2 is an illustrative plan view of a part of the keyboard instrument for describing the leg attachment structure of the present invention.

A rod-shaped portion 61 is provided continuously to a plate surface by welding, etc., at a position eccentric from the center of a lower surface of the plate 6. In a plan view of FIG. 2, the position where the rod-shaped portion 61 is continuously provided is a position on the right lower side of the center of the plate surface (eccentric position), and an abutment surface is ensured on the plate upper side (part projecting to the keyboard rear side of the leg main body 5) and the left side (part projecting to the keyboard side of the leg main body 5). That is, as shown in FIG. 2, at the time of installing the plate 6 to the leg main body 5, two adjacent sides of the plate 6 are positioned entirely on the outside of the upper surface of the leg main body 5.

Holes 62a, 62b, 62c, 62d, 62e are formed on the plate 6 along peripheral sides, and the plate 6 is fixed onto the upper surface of the leg main body 5 via a screw (not shown) inserted into the hole 62a from the upper side.

The rod-shaped portion 61 is formed into a columnar shape insertable into a hole portion 51 provided in the leg main body 5 and a thread is formed on a periphery in a spiral shape. That is, by inserting the metal rod shape portion 61 into the hole portion 51 of the wooden leg main body 5 while screwing, looseness between the leg main body 5 and the rod-shaped portion 61 of the plate 6 is eliminated, and the plate 6 is fixed to the leg main body 5 at a desired position. At that time, a thread is formed only on the rod-shaped portion 61 side, and thus, by screwing the plate 6 into the leg main body 5 and fixing the plate so as to be at the desired position, it is possible to reliably make a desired leg surface face the front surface side of an instrument main body.

In terms of strength, the length of the rod-shaped portion 61 is preferably as long as possible. However, in a case where processing accuracy of the hole portion 51 is considered, the length is preferably about 60 to 90 mm. In the present embodiment, the length is 80 mm which is a length with which both the strength and the processing accuracy can be achieved in a well-balanced manner.

In a case where the left-right width of the upper surface of the leg main body 5 is 30 to 40 mm, a diameter of the hole portion 51 is preferably about 8 to 12 mm A structure in which the rod-shaped portion 61 is fitted to the hole portion 51 without forming any thread on the periphery of the rod-shaped portion 61 may be adopted. In this case, insertion may be made in a state where the plate 6 is aligned at a desired position, into the leg main body 5.

Side arms 4 are installed on both side surfaces of the key bed 1. A groove portion 7 continuous over both a lower surface of the key bed 1 and a lower surface of each of the side arms 4 is formed by a groove 7a provided on the lower surface of the key bed 1 and a groove 7b provided on the lower surface of the side arm. The plate 6 is fitted to and arranged in this groove portion 7.

The leg main body 5 integrated with the plate 6 is fixed to the lower surface of the side arm 4 via a screw (not shown) inserted into the hole 62b from the lower side, and also fixed to the lower surface of the key bed 1 via screws (not shown) respectively inserted into the holes 62c, 62d, 62e from the lower side.

That is, by using the plate 6 fitted to the groove portion 7, a leg fixing structure in which three parts of the key bed 1, the side arm 4, and the leg main body 5 are fixed to each other is achieved.

Figure 3:
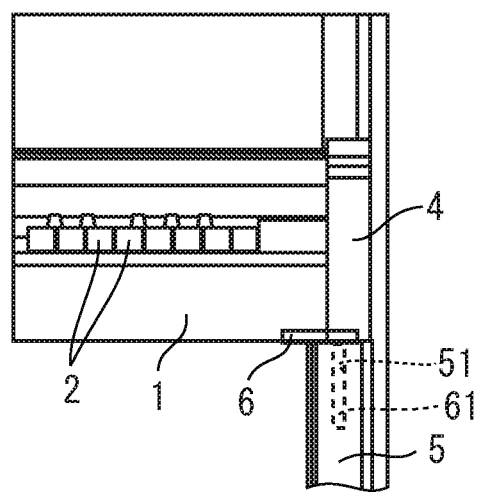
FIG. 3 is an illustrative front view of a part of the keyboard instrument for describing the leg attachment structure of the present invention.
Figure 4:
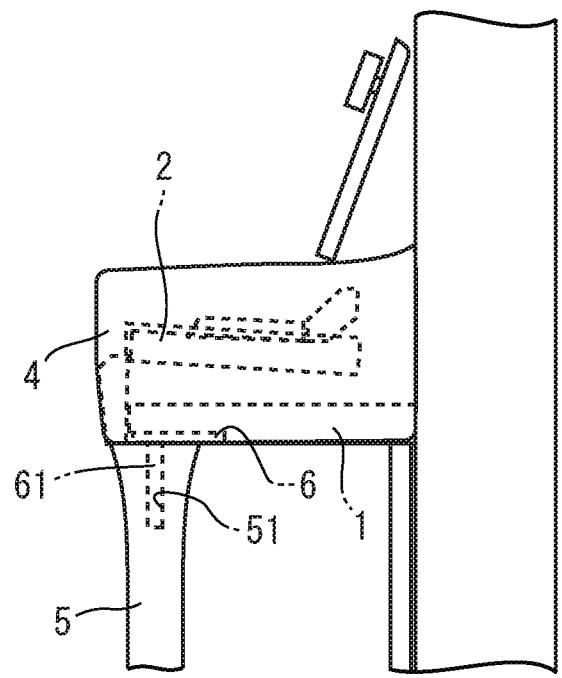
FIG. 4 is an illustrative side view of a part of the keyboard instrument for describing the leg attachment structure of the present invention.

In this leg fixing structure, as shown in FIGS. 2 to 4, the plate 6 is installed at a position eccentric to the inner side and the rear side of the keyboard portion 3 with respect to the upper surface of the leg main body 5. Thereby, an area where abutment is made is increased on the inner side and the rear side of the keyboard portion 3, so that a structure in which the leg main body 5 is not easily displaced to the inner side and the rear side of the keyboard portion 3 in a case where force from the outside acts on the leg main body 5 can be achieved.

Figure 5:
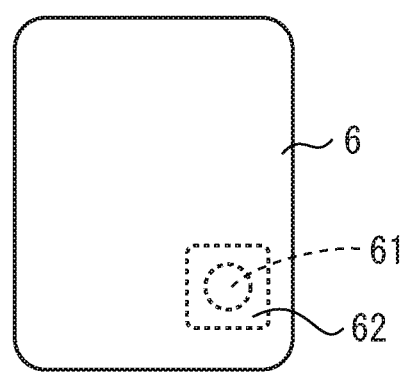
FIG. 5 is an illustrative plan view of a leg main body and a plate showing another embodiment.
Figure 6:
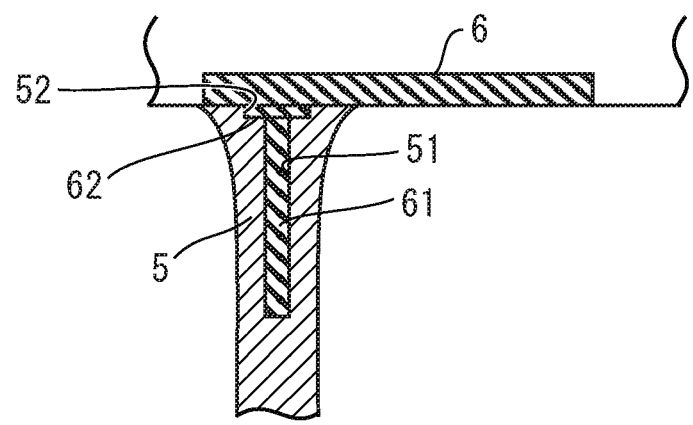
FIG. 6 is an illustrative sectional view of the vicinity of a leg in a case where a leg attachment structure of FIG. 5 is adopted.

FIGS. 5 and 6 show another embodiment of the leg fixing structure, including a structure in which a leg main body 5 is not easily rotated with respect to a plate 6. The parts having the same configurations as FIGS. 1 to 4 will be given the same reference signs.

In this example, a square rotation prevention plate 62 is fixed to a lower surface of the plate 6, and a rod-shaped portion 61 is provided for this rotation prevention plate 62. A square groove 52 to which the rotation prevention plate 62 is fitted is provided on the leg main body 5 side.

According to this structure, by fitting the rotation prevention plate 62 to the square groove 52, it is possible to prevent rotation of the leg main body 5 with respect to the plate 6.

Figure 7:
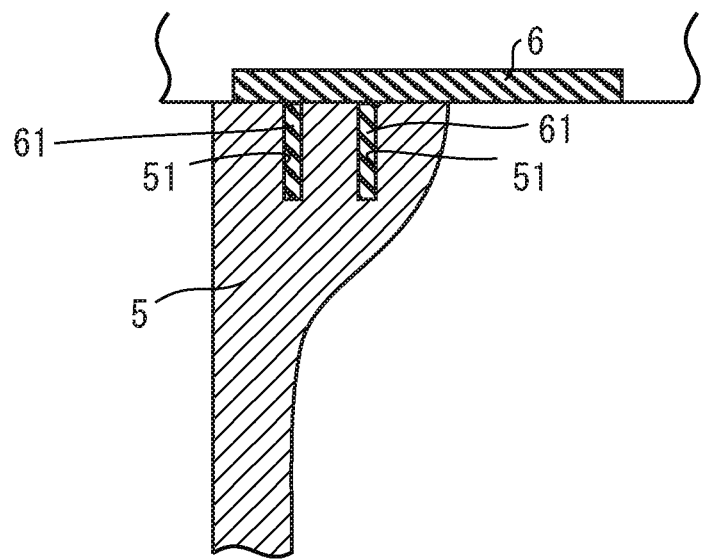
FIG. 7 is an illustrative sectional view of the vicinity of a leg in a case where a leg attachment structure of another embodiment is adopted.

FIG. 7 shows another embodiment of the leg fixing structure, which is a structure in which two rod-shaped portions 61 are provided for the plate 6. The parts having the same configurations as FIGS. 1 to 4 will be given the same reference signs.

This example is the structure adoptable for a type in which an area of an upper surface of a leg main body 5 in the front to back direction (the front to back direction with respect to a keyboard portion 3) is large. The two rod-shaped portions 61 are provided on a lower surface of the plate 6 in the front to back direction of the keyboard portion 3, and respectively inserted into hole portions 51 provided in the leg main body 5.

According to this structure, the plate 6 and the leg main body 5 are combined with each other by the two rod-shaped portions 61. Thus, it is possible to enhance fixing strength and prevent rotation of the leg main body 5 with respect to the plate 6.

According to the leg fixing structures described above, by fixing to the key bed 1 and the side arms 4 via the plates 6 fixed to the leg main bodies 5, it is possible to ensure the strength with a simple structure and extend the freedom of design of the legs.

REFERENCE SINGS LIST

1 . . . key bed
2 . . . plural key
3 . . . keyboard portion
4 . . . side arm
5 . . . leg main body
6 . . . plate
7 . . . groove portion
51 . . . hole portion
61 . . . rod-shaped portion
62 . . . rotation prevention plate

What is claimed is:

1. A leg attachment structure for a keyboard instrument comprising:
   leg main bodies that support a keyboard portion from both sides, the keyboard portion in which plural keys are arranged on a key bed: and
   plates installed on upper surfaces of the leg main bodies,
   wherein the plates and the leg main bodies are fixed by inserting rod-shaped portions formed on lower surfaces of the plates into hole portions provided in the leg main bodies,
   wherein the plates are formed to be larger than an area of the upper surfaces of the leg main bodies,
   wherein the plates are configured to be positioned eccentric to an inside and a rear side of the keyboard portion by locating the plates so as to be displaced inward with respect to the upper surfaces.

2. The leg attachment structure for the keyboard instrument according to claim 1, wherein
   the plates and the rod-shaped portions are made of metal and the leg main bodies are made of wood, and
   by forming a thread on the rod-shaped portions and inserting the rod-shaped portions into the hole portions, the leg main bodies and the plates are fixed.

3. The leg attachment structure for a keyboard instrument according to claim 1, comprising,
   side arms on both side surfaces of the key bed, and
   groove portions each of which is continuous over both a lower surface of the key bed and a lower surface of each of the side arms,
   wherein the plates are fitted to the groove portions, the key bed, the side arms, and the leg main bodies to thereby fix the plates are fixed.

4. A leg of a keyboard instrument comprising:
   an elongated leg main body in which a hole portion is provided at a center position on an upper surface; and
   a plate having an area larger than an area of the upper surface of the elongated leg main body, the plate for which a rod-shaped portion to be inserted into the hole portion is formed, the plate being installed on the upper surface of the elongated leg main body, wherein
   the rod-shaped portion is formed at a position eccentric from a center of the plate,
   two adjacent sides of the plate are positioned entirely on an outside of the upper surface of the elongated leg main body, and
   the plate is configured to be positioned eccentric to an inside and a rear side of a keyboard portion by locating the plate so as to be displaced inward with respect to the upper surface.

5. The leg of the keyboard instrument according to claim 4, wherein
   the plate and the rod-shaped portion are made of metal and the elongated leg main body is made of wood, and
   a thread is provided on the rod-shaped portion and the rod-shaped portion is inserted into the hole portion, whereby the elongated leg main body and the plate are fixed.

* * * * *